United States Patent [19]

Thompson et al.

[11] 4,377,094

[45] Mar. 22, 1983

[54] LIQUID COOLED DISC BRAKE FOR DIFFERENTIAL OF A TRACKED VEHICLE

[75] Inventors: James A. Thompson; Micheal G. Beeley, both of Logan, Utah

[73] Assignee: Logan Manufacturing Company, Logan, Utah

[21] Appl. No.: 97,915

[22] Filed: Nov. 28, 1979

[51] Int. Cl.³ .......................... F16H 1/44; F16D 65/84
[52] U.S. Cl. ..................................... 74/710.5; 74/714; 74/773; 180/6.7; 188/71.6; 188/264 F
[58] Field of Search ................ 188/71.5, 71.6, 264 F, 188/264 E, 264 D; 180/6.7; 74/710.5, 714, 773; 192/70.2, 70.12, 113 B

[56] References Cited

U.S. PATENT DOCUMENTS

| | | | |
|---|---|---|---|
| 1,731,064 | | Spase | 192/70.2 |
| 2,580,381 | 1/1952 | Banker | 180/6.7 |
| 2,928,504 | 3/1960 | Hahn et al. | 188/71.5 |
| 2,940,549 | 6/1960 | Hause et al. | 188/71.5 |
| 2,946,239 | 7/1960 | Hait | 74/710.5 |
| 2,971,612 | 2/1961 | Graber | 188/71.5 |
| 3,202,253 | 8/1965 | Merritt et al. | 192/113 B |
| 3,291,273 | 12/1966 | Hansen | 192/70.2 |
| 3,659,668 | 5/1972 | Ross | 180/6.7 |
| 3,915,272 | 10/1975 | Maurice | 190/70.2 |
| 4,022,298 | 5/1977 | Malinowski | 188/71.6 |
| 4,113,067 | 9/1978 | Coons et al. | 192/70.12 |
| 4,245,524 | 1/1981 | Dammon | 74/710.5 |

FOREIGN PATENT DOCUMENTS 296368  6/1971 Austria ........................... 74/710.5

Primary Examiner—Allan D. Herrmann
Attorney, Agent, or Firm—A. Ray Osburn

[57] ABSTRACT

An improvement for a steering differential for a tracked vehicle comprising a liquid cooled, hydraulically operated disc brake, two of which are normally used upon the differential to brake and steer the vehicle. A number of stationary discs are keyed internally to a brake body, with a number of rotating discs dispersed therebetween and splined to a braking axle of the differential, the rotating and stationary discs being hydraulically compressed together to apply braking torque to the braking axle. Oil or other suitable liquid is pumped through the brake body and radially through grooves on the faces of the discs to prevent excessive heating of the discs and the brake.

17 Claims, 7 Drawing Figures

LIQUID COOLED DISC BRAKE FOR DIFFERENTIAL OF A TRACKED VEHICLE

BACKGROUND OF THE INVENTION

1. Field

The field of the invention is disc brakes for tracked vehicles, and more particularly those associated with differentials of such vehicles.

2. Prior Art

Differentials have been extensively used to transmit power from engines of tracked vehicles to track drive shafts. Vehicle steering has been accomplished by overdriving the track drive shaft on the side of the vehicle away from the direction of turn, by braking the drive shaft on the side toward the turn, or by a combination of both. Some differentials have also utilized internal braking devices to slow the rotation of the power output shaft linked with the track drive shaft on the side toward the turn, while increasing the rotation of the power output shaft away from the turn. These braking devices are distinctly disadvantageous because of contamination of differential fluid from wearing brake parts, and because of their inaccessibility for repair purposes. Some differentials have utilized internal braking gears with connecting shafts extending outside the differential housing. A type of such a differential is disclosed and claimed in Austrian Pat. No. 296,368. Various types of friction braking devices have been suggested and sometimes actually employed for use on the braking axles outside the differential housing, including friction disc types, which are claimed in the above mentioned patent generally as a preferred brake type without any mention of cooling provisions. However, none of these prior brakes, including the disc types, have been capable of continued use without frequent repair and replacement of friction components because they have lacked adequate provisions for cooling of these critical components. Cooling is essential because the brakes are in almost constant use when the vehicle is being operated.

Liquid cooled disc brakes have been disclosed for directly braking the wheels of vehicles other than tracked vehicles, for example, in U.S. Pat. Nos. 2,940,549, 2,955,682, 2,971,612, and 2,928,504. However, none of these have been adapted for use in conjunction with a vehicle differential, and especially not with the differential of a tracked vehicle.

SUMMARY OF THE INVENTION

The invention is an improvement for a steering differential for a tracked vehicle, the steering differential being of the type having two oppositely extending track drive power output axles and two rotating braking axles each extending oppositely outside the differential transverse to the vehicle, the improvement comprising two liquid cooled disc brakes, each adapted for mounting on the differential to engage one of the braking axles. The brakes are controlled by the vehicle operator singly or simultaneously to brake the vehicle or to cause it to turn toward either of its tracks as may be required. Each brake comprises a plurality of stationary friction discs, slideably keyed axially to a stationary brake disc housing. Each one of a plurality of rotating discs extends between a pair of opposing adjacent faces of the stationary discs. The rotating discs are keyed to slide axially to, and rotate with, the associated braking axle. Means are provided for compressing the discs together to apply torque to the rotating braking axle, which may comprise a hydraulic piston within the brake body to which pressurized hydraulic fluid is directed to actuate the piston axially against the discs. Passage and connection means are provided permitting cooling liquid to be pumped through the brake housing and over all the friction faces of the discs.

The steering differential is of the type comprising a braking gear on each of the braking axles meshed with suitable differential gearing in such a way that incoming primary power is divided to provide less power to the output shaft on the braked side of the differential and more to the opposite side.

The invention has a primary object of providing a long lasting, economical, readily accessible, serviceable, and repairable brake for steering differentials of tracked vehicles.

DETAILED DESCRIPTION OF ILLUSTRATED EMBODIMENTS

Figure 1:
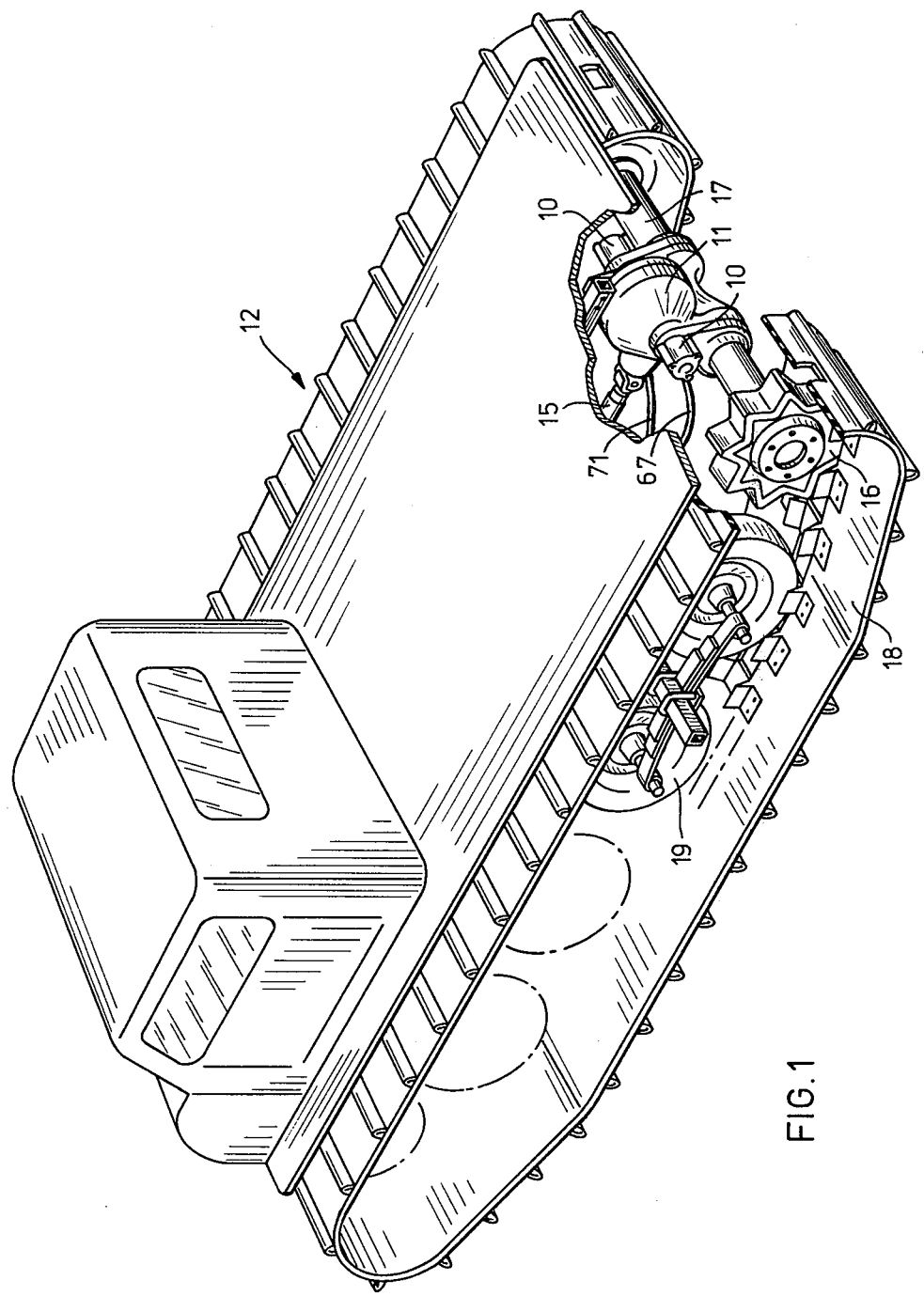
FIG. 1 is a perspective representation of a tracked vehicle, partially cut away to show the disc brakes of the invention installed upon the differential of the vehicle, along with associated drive shafts and sprockets.

A pair of identical liquid cooled disc brakes, each generally designated 10, is indicated in FIG. 1 installed upon a suitable differential assembly 11 carried by a track laying vehicle 12. Vehicle 12 comprises also an engine 13 (FIG. 2), a transmission 14, (FIG. 2), and a vehicle drive shaft assembly 15, all of which cooperate to provide power to differential 11, which in turn transmits the power to each of two track drive sprocket wheels 16 through each of two sprocket drive shaft assemblies 17. The sprocket wheels 16 each continuously engage one of two illustrated endless belt cleated tracks 18 to propel vehicle 12 over the terrain. One or more bogie wheel assemblies 19 are employed to guide and support each of the tracks 18 upon vehicle 12.

The two disc brake assemblies 10 are each secured to differential 11 and linked to one of two braking gear members 37 internal to differential 11, each gear member 37 being associated with one of the two sprocket drive shaft assemblies 17. (FIG. 2) The brake assemblies 10 may be employed together or independently to control the power transmitted to the sprocket wheels 16, as hereinafter more fully described, to brake the vehicle 12 or to cause it to turn. Each disc brake 10 has internal rotating discs 45 (FIG. 4) splined to one of two braking axles 36 (FIG. 2), each braking axle 36 being associated with one of the braking gear members 37 internal to differential 11. The rotating discs 45 extend radially between stationary discs 42 keyed to a brake housing 39. When braking is desired, pressurized hydraulic fluid is used to compress the discs 42 and 45 together in frictional engagement, braking torque being thus applied to braking axle 36.

Figure 2:
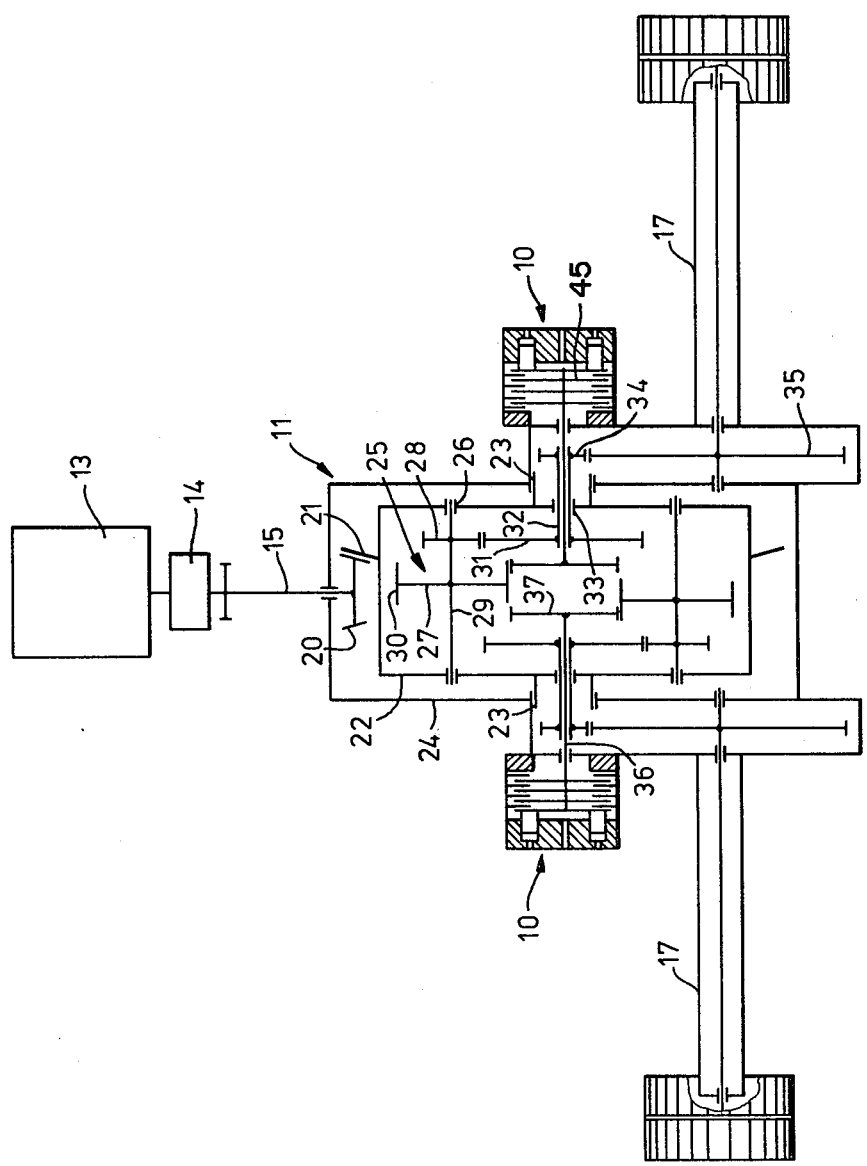
FIG. 2 is a schematic representation of the inventive brakes in association with internal components of the differential, with the vehicle engine and power transmission, main drive shaft, sprocket drive shafts and tracks of the vehicle also indicated.

Disc brake 10 may be designed for use with any differential 11 having internal braking provisions similar to those of a differential now briefly described. The structure of differential 11 is schematically indicated in FIG. 2 and shown in partial cross section in FIG. 3. Driving pinion gear 20 on rotating engine drive shaft 15 engages differential carrier drum gear 21 on the circumference of carrier drum 22, which is thereby caused to rotate about drum bearing 23 in differential housing 24. Carrier drum 24 carries six identicaly configured planet gears generally designated 25, each supported rotatably within carrier drum 22 through planet gear bearings 26. Each planet gear 25 includes a pair of gear members, a larger gear member 27 and a smaller gear member 28 spaced apart on a planet gear shaft 29. The larger gear member 27 is offset a small distance from the vertical center plane of carrier drum 22 and the smaller gear member 28 is offset a greater distance therefrom. Alternate ones of the six planet gears 25 are installed in reversed orientation within the carrier drum 22, so that the six pairs of gear members 27 and 28 are alternately positioned oppositely away from the vertical center plane of carrier drum 22. The width of toothed rims 30 of the larger gear members 27 overlap so that the six planet gears are serially intermeshed. Therefore, when any one of the six planet gears 25 is caused to rotate with respect to carrier drum 22, all of the six must so rotate. The three alternate ones on one side of the center plane of the drum 24 rotate oppositely from the three on the other side.

The three of the smaller gear members 28 on each side of the vertical center plane of differential 11 each meshes with one of a pair of power output gear members 31, each carried at its center upon a tubular power output axle 32 which is coaxial with carrier drum 22 and braking axle 36. Each power output axle 32 extends through an end of carrier drum 22 by way of an output bearing 33. Outside differential housing 24 and rigidly secured to tubular output shaft 32 is an outer output gear member 34 which meshes with a sprocket axle drive gear 35.

When the carrier drum 22 is rotated by engine 13 through drive pinion gear 20, and no braking torque is applied to axle 36, all of the outer output gear members 28 rotate at the same rate and in the same direction so that sprockets 16 turn at the same rate and vehicle 12 is thereby driven directly forwardly or rearwardly. Since gear members 27 are all meshed together, gears 27 and 28 rotate only with carrier drum 22 and not about their own axes.

A liquid cooled disc brake 10 is mounted on each side of differential housing 24. Oil is preferred, but other low freezing point liquids could be utilized equally well. Each brake 10 carries a braking axle 36 extending axially through tubular power output axle 32. At its end inside carrier drum 22, each axle 32 carries one of the braking gear members 37, which meshes with each of the toothed rims 30 of the three of the larger planet gear members 27 located closer to its side of carrier drum 22. Until brake 10 is actuated, each braking gear member 37 and each braking axle 36 rotates freely under the impetus of its associated larger planetary gear members 27, so that vehicle 12 tends to travel in a straight line as described above. When brake 10 is actuated, braking torque is thereby applied to its braking axle 36, in a manner hereinafter described, and the velocity of the toothed rims of the connecting three larger planet gear members 27 are slowed, as are the three whole planet gears 25. Consequently, the rotation of associated output gear member 31 is slowed. Also, these three planet gears 25 are now caused to rotate with respect to carrier drum 22, and the remaining three meshed therewith to rotate oppositely, so that the velocity of their toothed rims increases. Consequently, the other output gear member 31 is caused to rotate faster. Thus, the track on the braked side of vehicle 12 is slowed, while that on the opposite side is increased, and said vehicle turns toward its braked side.

For abrupt turns, brake 10 may be employed to completely stop the rotation of braking axle 36 and braking gear member 37. For more frequently used more gradual turning, said rotation is only slowed. The brake 10 therefore should be capable of prolonged slipping during vehicle steering without over heating, and this capability is achieved in brake 10 in a manner now described.

Figure 3:
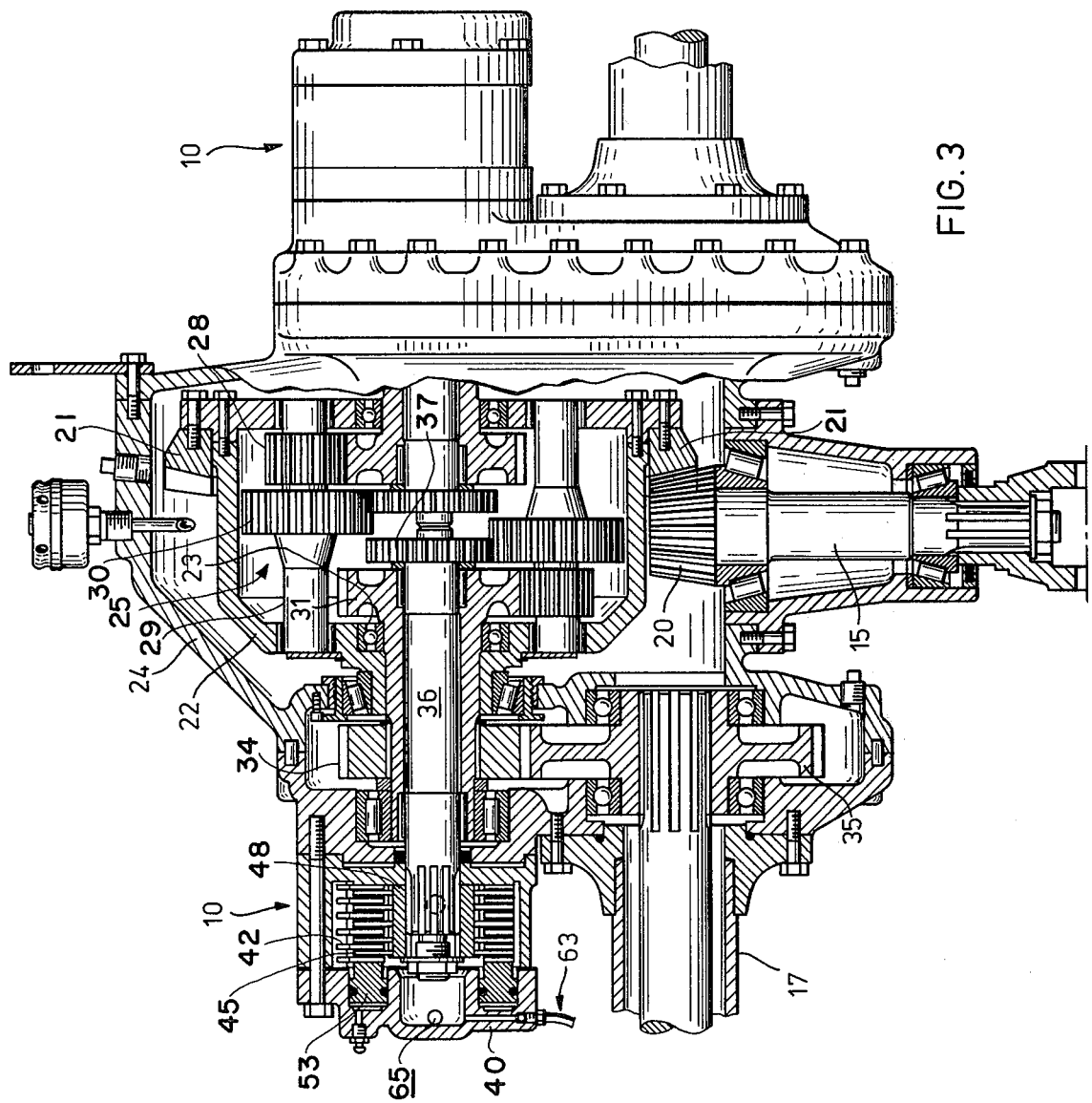
FIG. 3 is a representation of the disc brakes of the invention installed upon one example of a suitable differential, one of the brakes and a portion of the differential being sectioned to partially show internal components of the differential, the main driveshaft shown rotationally displaced.
Figure 4:
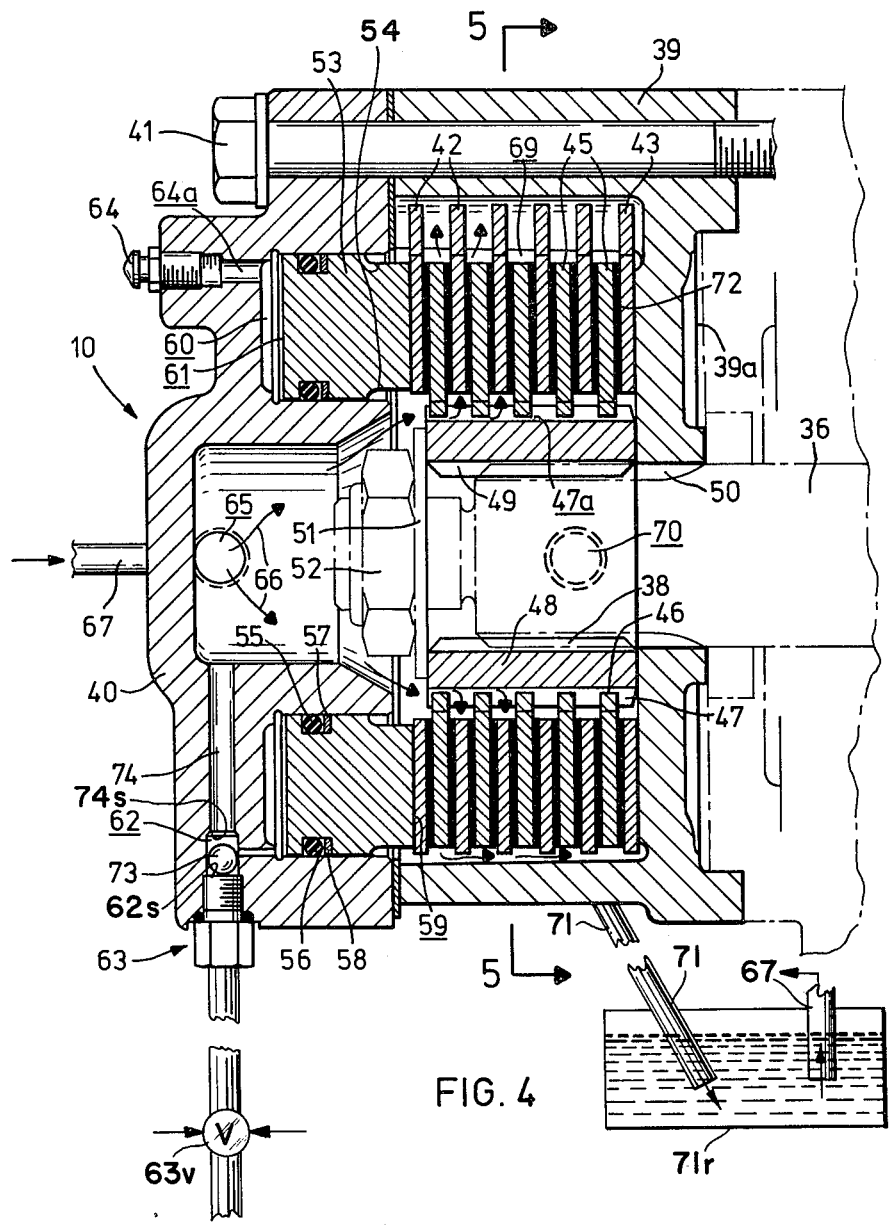
FIG. 4 is a larger scale, partially skewed, longitudinal cross sectional view of a disc brake according to the invention, with a portion of the connecting differential shown in phantom.
Figure 5:
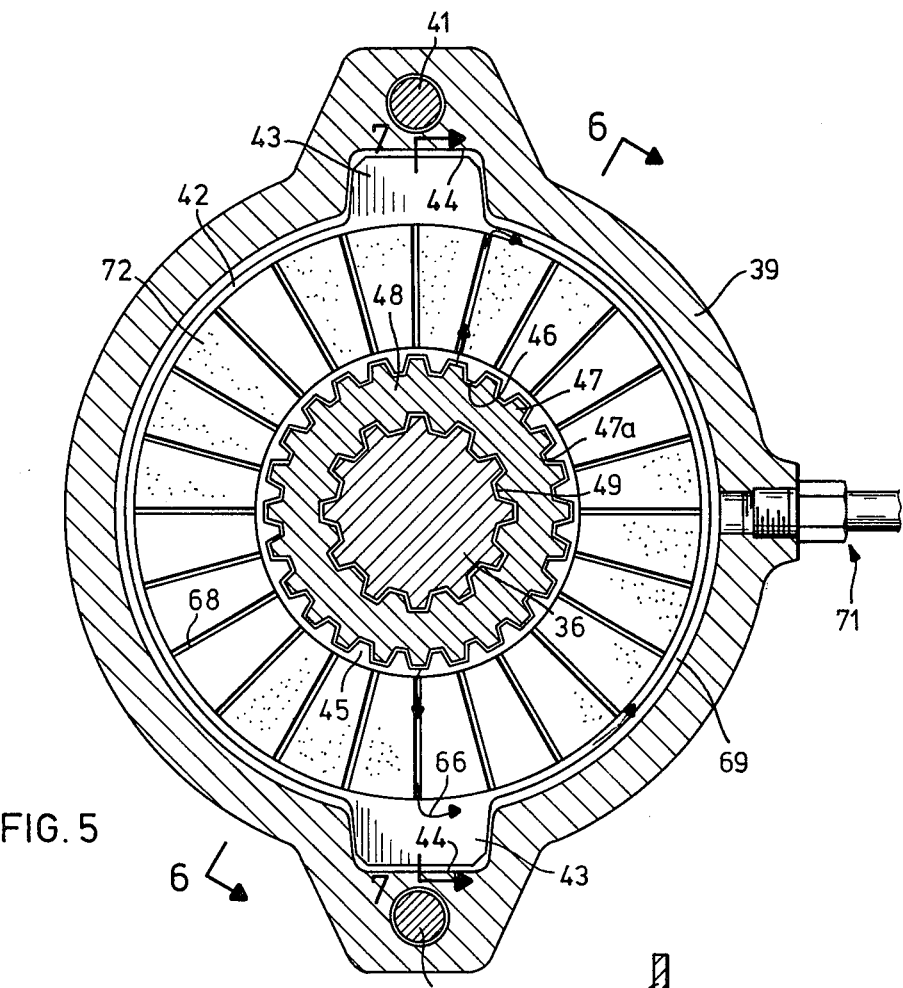
FIG. 5 is a sectional view taken along line 5—5 of FIG. 4.

Liquid cooled disc brakes 10, as seen best in FIGS. 3 and 4, are mounted one on each side of the outside of differential housing 24, each in meshing engagement with a splined end 38 of one of the braking axles 36. Each disc brake 10 comprises a hollow external brake housing 39 with an integral transverse generally flat end 39a and a mating end cap 40, all secured together and to differential housing 24 by mounting bolts 41. Brake housing 39 contains six generally annular, stationary friction discs 42, each having two radial outwardly protruding keys 43 each slideably engaging one of two longitudinal housing keyways 44 interior to disc housing 39. See FIGS. 5, 6 and 7. One of five generally annular rotating friction discs 45 is disposed between each pair of opposing faces of adjacent stationary discs 42. Longitudinal female keyways 46 internal to each rotating disc 45 engage male teeth 47 external to a shaft connecting sleeve 48, which sleeve has an internal female spline gear 49 meshed with external spline 50 on braking shaft 36. Sleeve 48 is retained upon braking shaft 36 by washer 51 and self-locking nut 52.

An annular piston 53 is disposed slideably in an internally opening annular piston cylinder 54 provided in end cap 40. Moveable fluid seals 55 and 56 are provided respectively about the internal and external circumferences of piston 53, along with corresponding moveable wiper rings 57 and 58. Disc facing surface 59 of piston 53 extends to abut against the adjacent end of one of the stationary discs 42. An annular space 60 between piston 53 and end cap 40 accepts pressurized hydraulic fluid to act upon piston face 61. Tapped passage 62 connects with space 60, and a hydraulic fluid supply tube and fitting 63 is connected to passage 62. A check valve ball 73 is installed in passage 62, its function being described hereinafter. Air bleed-pressure relief fitting 64 installed in a passage 64a in end cap 40 permits space 60 to be completely filled with incompressible hydraulic fluid from a fluid supply reservoir, not shown, with which fluid line 63 is in fluid communication. Fluid line 63 also carries a fluid pressure control valve suitably linked to operator controlled steering and braking devices of vehicle 12. The operator may apply greater or lesser hydraulic pressure upon face 61 of piston 53 to force the faces of stationary discs 42 and rotating discs 45 together against end wall 39a with corresponding greater or lesser force, thereby applying controlled braking torque to braking axle 36. Since each disc brake 10 has its separately controlled hydraulic control valve 63v, the operator may control both, sequentially or simultaneously, as may be required for vehicle steering and/or braking.

When brake 10 is used as described, the friction between the stationary discs 42 and the rotating discs 45 tends to generate a great amount of heat which must be dissipated to prevent rapid deterioration of the friction surfaces of the discs, warping of the discs, overheating of the hydraulic fluid, and the like. In oil cooled disc brake 10, cooling oil is caused to flow between each pair of adjacent faces of the stationary and rotating discs 42 and 45, as indicated by arrows 66 in FIGS. 4 and 5. The cooling oil is made to enter end cap 40 through oil inlet passage 65, which is tapped for connection of oil inlet line 67 (FIG. 4). From end cap 40, the cooling oil flows through keyway passage 47a (FIG. 4) and thence radially along radial grooves 68 (FIG. 5), provided in the surface of each face of each rotating disc 45. The grooves 68 assure that cooling oil will flow between each set of opposing faces of discs 42 and 45. The oil then flows generally circumferentially via annular passage 69, provided between the outer circumferences of discs 42 and 45 and the cylindrical wall of brake housing 39, and then through a tapped oil outlet passage 70 through disc housing 39 and into oil outlet line 71. Line 71 connects with an oil cooling receptacle 71r for subsequent re-circulation through brake 10.

During operating periods when brake 10 is not being used, hydraulic fluid pressure not then being applied, cooling oil pressure inside brake housing 39 tends to force piston 53 away from the discs 42 and 45. The discs 42 and 45 thus tend to become loose and separated, which tends to adversely effect the response of brake 10 when subsequently actuated. Accordingly, ball check valve 73 is used to equalize pressure across piston 53, so that it is not so urged away from the discs 42 and 45. Passage 74 in end cap 40 permits cooling oil pressure to unseat ball 73 from valve ball seat 74s in passage 74 to seat instead upon ball seat 64s in hydraulic fluid passage 62. Cooling oil pressure thus may act also against face 61 of piston 53 so that the piston 53 and the discs 42 and 45 remain in continued gentle contact. When the greater braking fluid pressure is subsequently applied, ball 73 is thereby again seated in passage 74 and braking fluid pressure is exerted only against face 61.

Figure 6:
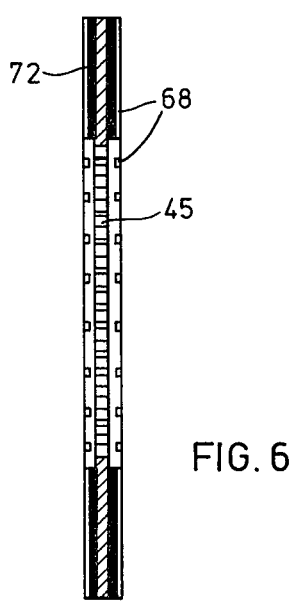
FIG. 6 is a longitudinal cross sectional view of a rotating disc according to the invention, taken generally along line 6—6 of FIG. 5.
Figure 7:
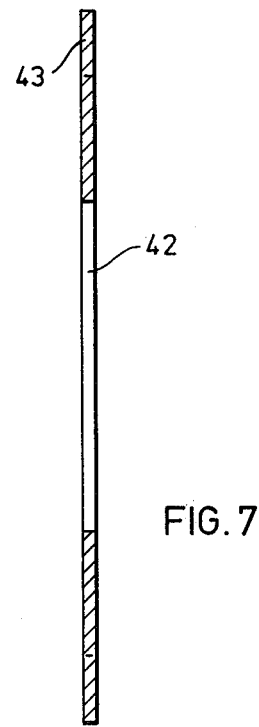
FIG. 7 is a longitudinal cross sectional view of a stationary disc according to the invention, taken generally along line 7—7 of FIG. 5.

As best seen in FIG. 6, each rotating disc 45 is suitably faced on both sides with sintered metal such as brass, organic material such as a phenolic, or the like 72, as well known in the art to provide efficient braking action and wearing performance when used with the metallic stationary discs 42. Alternately, the coating 72 could be employed upon the faces of stationary discs 42. Similarly, grooves 68 could be carried on the faces of stationary discs 42 instead of upon rotating discs 45 without essential effect upon the operation of brake 10.

Other embodiments than those shown and described may be employed without departing from the essential spirit of the invention. For example, other means than hydraulic, such as a motor drive or a mechanical force device, may be used to urge piston 53 against the discs 42 and 45. In further example, provisions could be made for diverting a portion of the braking fluid through the housing 39 to cool the discs 42 and 45, thereby eliminating the use of separate means for cooling said discs. In still further example, the disc brake may be adapted for installation interior to a differential housing 24, should this be considered desirable, other cooling fluids than oil may be provided for in the brake design. The embodiments illustrated and described herein are for illustrative purposes only. All embodiments within the scope and breadth of the appended claims, and all equivalents thereof, are intended to be embraced therein.

We claim:

1. A liquid cooled disc brake adapted for installation upon the steering differential of a tracked vehicle in controllable braking engagement to one of the rotating braking axles thereof, said brake comprising:
   a disc housing adapted to accept the braking axle rotatably therethrough;
   serially interleafed, concentric discs within the housing, alternate ones of which are keyed in fixed angular, axially slideable relationship to the wall of the housing and the braking axle;
   cooling liquid passage means for directing a flow of cooling liquid between and over the opposing faces of the interleafed discs;
   controllable hydraulic piston means for providing axial force urging the faces of the interleafed discs together;
   a hydraulic fluid passage through the disc housing for directing pressurized hydraulic fluid from outside the brake into actuating contact with the piston means;
   a cooling liquid inlet passage through the housing for directing cooling liquid to the interior thereof, along with a cooling liquid outlet passage through the housing, so that the cooling liquid may be pumped therethrough between the adjacent faces of the interleafed discs;
   a fluid passage in the housing joining the cooling liquid inlet passage and the hydraulic fluid passage; and
   check valve means at the juncture of the hydraulic fluid passage and said joining fluid passage for balancing pressure across the hydraulic piston when the hydraulic fluid is not pressurized.

2. The improvement of claim 1, wherein the joining fluid passage is axially aligned with an incoming portion of the hydraulic fluid passage at its juncture therewith, and wherein the check valve means further comprises:
   a pair of valve ball seats, one in the joining fluid passage near said juncture and one in the hydraulic fluid passage near said juncture remote from the hydraulic piston; and
   a valve ball disposed in the vicinity of said juncture and between said valve ball seats.

3. The improvement of claim 2, further comprising:
   a hydraulic fluid inlet line connecting with the hydraulic fluid passage in the housing;
   a controllable hydraulic fluid valve in the hydraulic fluid inlet line;

a cooling liquid inlet line connecting with the cooling liquid inlet passage in the housing;

a receptacle for cooling heated cooling liquid; and a cooling liquid outlet line connecting the cooling liquid outlet passage in the wall of the disc housing with the receptacle.

4. The improvement of claim 2, wherein the power output and braking axles of the steering differential are coaxial and the steering differential further comprises two braking gear members each attached to one of the braking axles, two power output gear members each attached to one of the power output axles, a carrier drum rotated by a drive shaft driven by the engine of the vehicle, six serially intermeshed larger planet gear members with axles rotatably mounted within the carrier drum, three of said larger planet gear members being meshed with one of the braking gear members and the remaining three meshed with the remaining braking gear member, six smaller planet gear members one mounted upon each planet gear axle, three of said smaller planet gear members meshed with one of the output gear members and the remaining three meshed with the remaining output gear member.

5. For a tracked vehicle steering differential comprising two track drive power output axles oppositely extending transverse to the vehicle and two rotating braking axles extending oppositely outside the differential transverse to the vehicle, the improvement comprising:

two liquid cooled disc brakes each adapted for installation upon the differential in controllable braking engagement to one of the rotating braking axles outside the differential, each of the liquid cooled disc brakes including;

a disc housing including a generally cylindrical wall, a generally open end, and on the opposite end being generally closed by a flat wall transverse to the cylindrical wall and carrying a central opening to accept one of the brake torque axles rotatably therethrough;

a housing end cap secured to and sealably closing the open end of the disc housing;

a plurality of concentric, generally annular stationary housing discs each installed transversely to the housing wall and keyed in fixed angular, axially slideable relation thereto, an end one of said discs being generally against the flat wall of the disc housing;

a plurality of concentrically annular rotatable axle discs, an outer annular portion of each disposed between each pair of opposing faces of the housing discs;

means for securing the rotatable axle discs in fixed angular, axially slideable relationship to an end portion of the brake torque axle;

means for securing the disc housing at its generally closed end to the housing of the differential;

controllable axial force means for urging the axle discs and the housing discs together toward and against the flat wall; and cooling liquid passage means for directing a flow of cooling liquid between and over the opposing faces of the axle discs and the housing discs.

6. The improvement of claim 5, wherein the means securing the rotatable axle discs comprises:

a plurality of keys each protruding radially inwardly from the inner circumference of the annular rotatable discs; and an axle sleeve adapted to be fixedly secured to the end portion of the brake torque axle, and having a plurality of keyways each loosely accepting one of the keys.

7. The improvement of claim 6, wherein the controllable axial force means comprises:

controllable hydraulic piston means.

8. The improvement of claim 7, wherein the hydraulic piston means comprises:

an annular concentric cylindrical piston recess in the housing end cap, the recess being axially aligned with the discs and having a closed end and an opposite open end toward the discs;

an annular hydraulic piston disposed generally within the piston recess in diametrically sealed relationship therewith and extending therebeyond to and against the adjacent end one of the stationary discs; and a hydraulic fluid passage in the housing end cap for directing hydraulic fluid of controlled pressure from outside the brake to the face of the hydraulic piston remote from the discs to controllably urge the piston against the adjacent end one of the plurality of discs.

9. The improvement of claim 8, wherein the cooling liquid passage means comprises:

a cooling liquid inlet passage through the housing end cap for directing cooling liquid to the interior of the disc housing;

a cooling liquid outlet passage through the cylindrical wall of the disc housing; and a plurality of radially directed grooves carried across each face of each rotating axle disc;

so that cooling liquid may be pumped into the housing end cap, thence axially along the keyways, thence radially through the grooves, and between the outer circumferences of the discs and the disc housing to the cooling liquid outlet passage through the wall of the disc housing.

10. The improvement of claim 9, further comprising:

a hydraulic fluid inlet line connecting with the hydraulic fluid passage in the housing end cap;

a controllable hydraulic fluid valve in the hydraulic fluid inlet line;

a cooling liquid inlet line connecting with the cooling liquid inlet passage in the housing end cap;

a receptacle for cooling the cooling liquid; and a cooling liquid outlet line connecting the cooling liquid outlet passage in the wall of the disc housing with the receptacle.

11. The improvement of claim 9, further comprising:

a fluid passage in the housing end cap joining the cooling liquid inlet passage and the hydraulic fluid passage; and check valve means at the juncture of the hydraulic fluid passage and said joining fluid passage for balancing pressure across the hydraulic piston when the hydraulic fluid is not pressurized.

12. The improvement of claim 11, wherein the fluid passage is axially aligned with an incoming portion of the hydraulic fluid passage at its juncture therewith, and wherein the check valve means further comprises:

a pair of valve ball seats, one in the fluid passage near said juncture and one in the hydraulic fluid passage near said juncture remote from the hydraulic piston; and a valve ball disposed in the vicinity of said juncture and between said valve ball seats.

13. The improvement of claim 12, further comprising:
a hydraulic fluid inlet line connecting with the hydraulic fluid passage in the housing end cap;
a controllable hydraulic fluid valve in the hydraulic fluid inlet line;
a cooling liquid inlet line connecting with the cooling liquid inlet passage in the housing end cap;
a receptacle for cooling heated cooling liquid; and
a cooling liquid outlet line connecting the cooling liquid outlet passage in the wall of the disc housing with receptacle.

14. The improvement of claim 12 wherein the power output and braking axles of the steering differential are coaxial and the steering differential further comprises two braking gear members each attached to one of the braking axles, two power output gear members each attached to one of the power output axles, a carrier drum rotated by a drive shaft driven by the engine of the vehicle, six serially intermeshed larger planet gear members with axles rotatably mounted within the carrier drum, three of said larger planet gear members being meshed with one of the braking gear members and the remaining three meshed with the remaining braking gear member, six smaller planet gear members one mounted upon each planet gear axle, three of said smaller planet gear members meshed with one of the output gear members and the remaining three meshed with the remaining output gear member.

15. For a tracked vehicle steering differential comprising two track drive power output axles oppositely extending outside the differential transverse to the vehicle and two rotating braking axles extending oppositely outside the differential transverse to the vehicle, said power output and braking axles being coaxial; two braking gear members each attached to one of the braking axles; two power output gear members each attached to one of the power output axles; a carrier drum rotated by a drive shaft driven by the engine of the vehicle; six serially intermeshed larger planet gear members with axles rotatably journalled within the carrier drum, three of said larger planet gear members being meshed with one of the braking gear members and the remaining three meshed with the remaining braking gear member; six smaller planet gear members one mounted upon each planet gear axle, three of said smaller planet gear members being meshed with one of the output gear members and the remaining three meshed with the remaining output gear member; the improvement comprising:
two liquid cooled disc brakes each adapted for installation upon the differential in controllable braking engagement to one of the rotating braking axles outside the differential, each liquid cooled disc brake including;
a disc housing including a generally cylindrical wall, a generally open end, and on the opposite end being generally closed by a flat wall transverse to the cylindrical wall and carrying a central opening to accept one of the brake torque axles rotatably therethrough;
a housing end cap secured to sealably closing the open end of the disc housing;
a plurality of concentric, generally annular stationary housing discs each installed transversely to the housing wall and keyed in fixed angular, axially slideable relation thereto, and end one of said discs being generally against the flat wall of the disc housing;
a plurality of concentrically annular rotatable axle discs, an outer annular portion of each disposed between each pair of opposing faces of the housing discs;
means for securing the rotatable axle discs in fixed angular, axially slideable relationship to an end portion of the brake torque axle;
means for securing the disc housing at its generally closed end to the housing of the differential;
controllable axial force means for urging the axle discs and the housing discs together toward and against the flat wall; and
cooling liquid passage means for directing a flow of cooling liquid between and over the opposing faces of the axle discs and the housing discs.

16. For a tracked vehicle steering differential comprising two track drive power output axles oppositely extending outside the differential transverse to the vehicle and two rotating braking axles extending oppositely outside the differential transverse to the vehicle, said braking axles each carrying a braking gear inside the differential meshing with gearing inside the differential so that braking torque applied to either of the braking axles causes the rate of rotation of one of the output axles to decrease and that of the other to correspondingly increase, the improvement comprising:
two liquid cooled disc brakes each adapted for installation upon the differential in controllable braking engagement to one of the rotating braking axles outside the differential, each of the liquid cooled disc brakes including;
a disc housing including a generally cylindrical wall, a generally open end, and on the opposite end being generally closed by a flat wall transverse to the cylindrical wall and carrying a central opening to accept one of the brake torque axles rotatably therethrough;
a housing end cap secured to and sealably closing the open end of the disc housing;
a plurality of concentric, generally annular stationary housing discs each installed transversely to the housing wall and keyed in fixed angular, axially slideable relation thereto, an end one of said discs being generally against the flat wall of the disc housing;
a plurality of concentrically annular rotatable axle discs, an outer annular portion of each disposed between each pair of opposing faces of the housing discs;
means for securing the rotatable axle discs in fixed angular, axially slideable relationship to an end portion of the brake torque axle;
means for securing the disc housing at its generally closed end to the housing of the differential;
controllable axial force means for urging the axle discs and the housing discs together toward and against the flat wall; and
cooling liquid passage means for directing a flow of cooling liquid between and over the opposing faces of the axle discs and the housing discs.

17. A liquid cooled disc brake adapted for installation upon the steering differential of a tracked vehicle in controllable braking engagement to a rotating braking axle thereof, said brake comprising:
a disc housing adapted to accept the braking axle rotatably into;
serially interleafed, concentric discs within the housing, alternate ones of which are keyed in fixed angular, axially slideable relationship to the wall of the housing and the braking axle;

cooling liquid passage means for directing a flow of cooling liquid between and over the opposing faces of the interleafed discs;

controllable axial force means comprising controllable hydraulic piston means for urging the faces of the interleafed discs together;

a hydraulic fluid passage through the housing for directing hydraulic fluid of controlled pressure from outside the brake to the interior of the brake to urge the piston means against the interleafed discs to urge said discs together;

passage means connecting the cooling liquid passage means and the hydraulic fluid passage means together; and check valve means at the juncture of the hydraulic fluid passage and said joining fluid passage for balancing pressure across the interleafed discs when the hydraulic fluid is not pressurized.

* * * * *